US005550565A

United States Patent [19]

Shiraishi et al.

[11] Patent Number: 5,550,565

[45] Date of Patent: Aug. 27, 1996

[54] IMAGE TRANSFORMATION APPARATUS

[75] Inventors: Toshihiro Shiraishi; Katsuakira Moriwake, both of Kanagawa, Japan

[73] Assignee: Sony Corporation, Tokyo, Japan

[21] Appl. No.: 226,845

[22] Filed: Apr. 13, 1994

[30] Foreign Application Priority Data

Apr. 17, 1993 [JP] Japan .................................... 5-113778

[51] Int. Cl.[6] ........................................................ G09G 5/36

[52] U.S. Cl. ............................................ 345/190; 348/578

[58] Field of Search .................................... 345/190, 200, 345/147; 348/578, 580, 583, 581, 441, 442

[56] References Cited

U.S. PATENT DOCUMENTS 4,622,589 11/1986 Bell .

FOREIGN PATENT DOCUMENTS 0437074 7/1991 European Pat. Off. .

OTHER PUBLICATIONS

JP-4-351078 A (NEC Corp.) see English language abstract.

*Primary Examiner*—Richard Hjerpe
*Assistant Examiner*—Regina Liang
*Attorney, Agent, or Firm*—William S. Frommer; Alvin Sinderbrand

[57] ABSTRACT

In an image transformation apparatus for performing predetermined image transformation with respect to an image, the image formed by an input video signal is stored in a memory, and then the input video signal of the memory is read by a read address data of predetermined read address generating means, by adding a random number generator to the read address generating means, such a special effect that the image seems to burst can be obtained.

8 Claims, 5 Drawing Sheets

IMAGE TRANSFORMATION APPARATUS

BACKGROUND OF THE INVENTION

1. Field of the Invention

This invention is related to an image transformation apparatus, and is applicable to, for example, a special effect process for rendering a special effect to a video signal.

2. Description of the Related Art

Heretofore an image transformation apparatus has been disclosed, for example, in U.S. Pat. No. 5,070,465.

In such image transformation apparatus, an input signal is sequentially written to a predetermined area of a frame memory, on the basis of a write address data output from a write address data generating circuit, and then the data of the above frame memory is read on the basis of a read address data input from a read address generating circuit. Thereby, the video signal is rendered various kinds of special effects, and the transformed image is displayed.

In such read address control system of an image transformation apparatus, it is difficult to add random numbers to desired pixels. As a result, rendering a special effect such that the image seems to burst radially from a point of the image, is difficult.

SUMMARY OF THE INVENTION

In view of the foregoing, an object of this invention is to provide an image transformation apparatus in which a special effect such that the image seems to burst, can be rendered.

The foregoing object and other objects of this invention have been achieved by the provision of an image transformation apparatus 10 for storing an image formed by an input video signal S1 to a memory 11, and for reading the input video signal S1 of the memory 11 on the basis of a read address data S4 of predetermined read address generating means 13, so that predetermined image transformation is executed with respect to the image: said image transformation apparatus comprising: transforming means 23 for transforming the read address data ($X_D$, $Y_D$) represented by the orthogonal coordinates into polar coordinates data ($R_D$, $\theta_D$); image extending means 24 for extending the polar coordinates data ($R_D$, $\theta_D$) forming the image in the radial directions, corresponding to the distance from the center of the image transformation effect; random number adding means 27 and 29 for adding predetermined random number to the polar coordinates data ($R_D$, $\theta_D$), corresponding to the distance from the center of the image transformation effect in the radial directions; and transforming means 30, 31, 32, and 33 for transforming the polar coordinates data converted by the image extending means 24 and the random number adding means 27 and 29, into the orthogonal coordinates data (X', Y'): said video signal being read from the memory 11 on the basis of the read address data transformed into the orthogonal coordinates data (X', Y'), so that the image formed by the input video signal S1 is given the burst effect.

Further, in the image transformation apparatus 10, the magnification rate $M_G$ of the burst effect is variable.

Further, in the image transformation apparatus 10, the burst scale of the burst effect is variable.

Further, in the image transformation apparatus 10, the random number generating area $M_R$ of the burst effect, is variable.

According to this invention, by adding a random number generator to the read address generator, an image transformation apparatus in which a burst such effect that the pixels are scattered can be realized.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
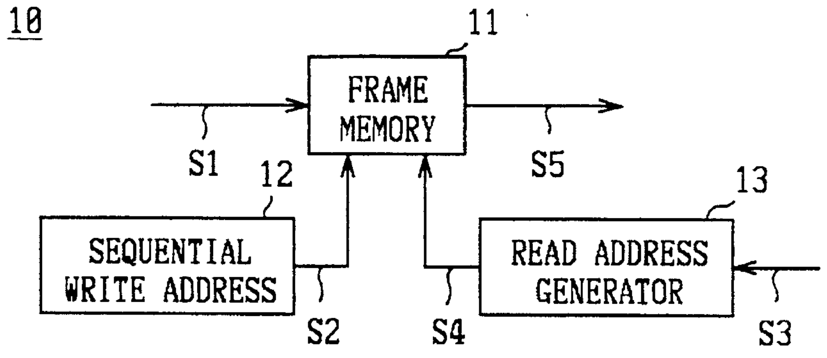
FIG. 1 is a block diagram showing an embodiment of the image transformation apparatus according to this invention.

Preferred embodiments of this invention will be described with reference to the accompanying drawings:

In FIG. 1, 10 generally denotes an image transformation apparatus. A digitalized input video signal S1 is written into a frame memory 11 on the basis of a write address signal S2 output from a sequential write address counter 12, without transforming the image.

Further, a read address generator 13 generating a read address data for reading an image data from the frame memory 11, inputs a sequential read address signal S3 to process the above sequential read address data, and then outputs the above processed read address data to the frame memory 11 as a read address signal S4. Thereby, the predeterminedly transformed image of the input video signal S1, is transformed into an output video signal S5 read from the frame memory 11 on the basis of the above read address data.

Figure 2:
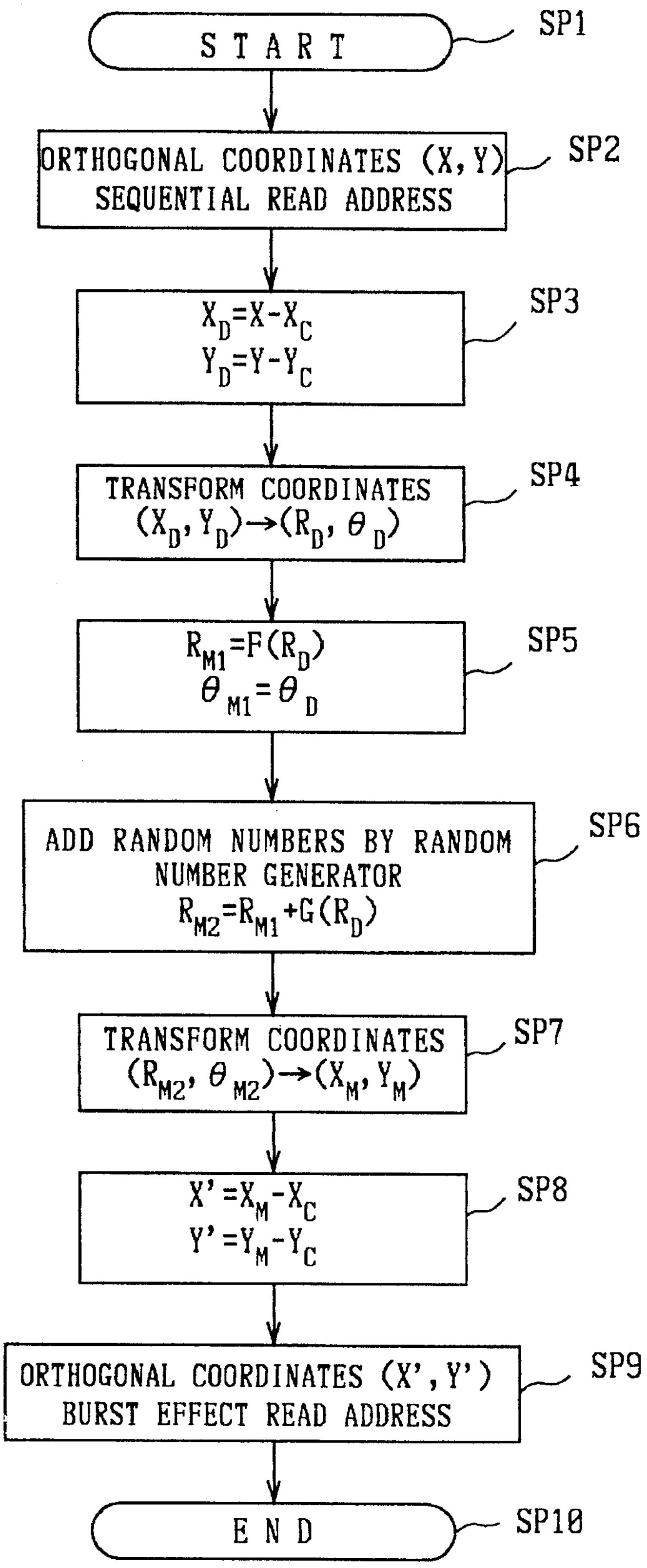
FIG. 2 is a flow chart showing the process of the generation of the burst effect read address in the image transformation apparatus of FIG. 1.

FIG. 2 shows the process of the generation of the burst effect read address data in the read address generator 13. The read address generator 13 starts the above process at step SP1, at the succeeding step SP2, the sequential read address data designated by the orthogonal coordinates system (x, y) is input by the read address signal S3, and then it proceeds to the succeeding step SP3.

Here, with respect to the sequential input read address (X, Y) to the read address generator 13, the center of the burst is represented by ($X_C$, $Y_C$), the magnification rate of the burst is represented by $M_G$, the burst scale is represented by $T_S$, and the random quantity is represented by $M_R$, Accordingly, at the step SP3, the read address generator 13 obtains the distances $X_D$ and $Y_D$ from the center of the burst ($X_C$, $Y_C$) to the read address (X, Y), and then obtains the distance $R_D$ from the center of the burst ($X_C$, $Y_C$) in accordance with the above distances $X_D$ and $Y_D$ by the following equation:

$$R_D=\sqrt{X_D^2+Y_D^2}=\sqrt{(X-X_C)^2+(Y-Y_C)^2} \quad (1)$$

Further, at the next step SP4, the read address generator 13 transforms the orthogonal coordinates ($X_D$, $Y_D$) into polar coordinates ($R_D$, $\theta_D$), and at the succeeding step SP5, it obtains the transformation quantity to magnify the burst at the center of the burst effect toward the outside directions, with reference to $R_D$, by the following equations:

$$R_{M1}=F(R_D) \quad (2)$$

$$OM_1=\theta_D \quad (3)$$

Figure 3:
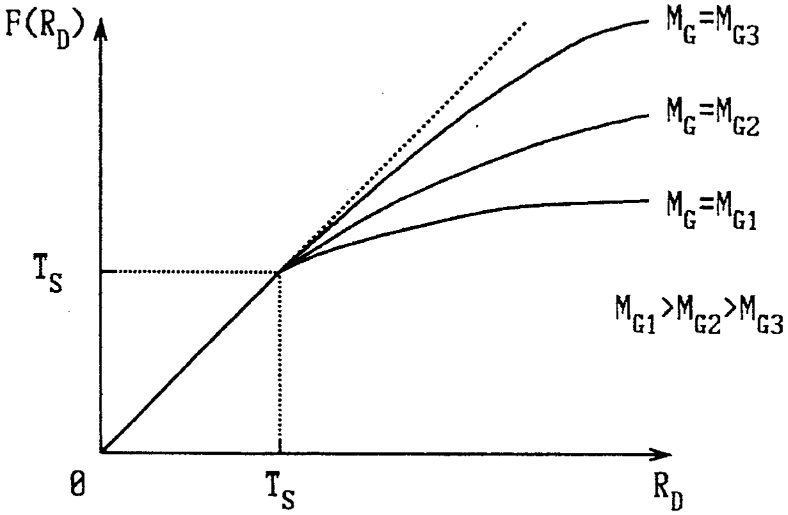
FIG. 3 is a curve diagram illustrating the F($R_D$) function used in the image transformation apparatus of FIG. 1.

Here, as shown in FIG. 3, the function $R_M1=F(R_D)$ is defined that as the distance from the origin increases, the inclination of the tangential line (primary differential coefficient) reduces.

Further, the read address generator 13 proceeds to the step SP6 to add the random number from the random number generator to the $R_{M1}$ by the following equations:

$$R_{M2}=R_{M1}+G(R_D) \quad (4)$$

$$\theta_{M2}=\theta_{M1}=\theta_D \quad (5)$$

Figure 4:
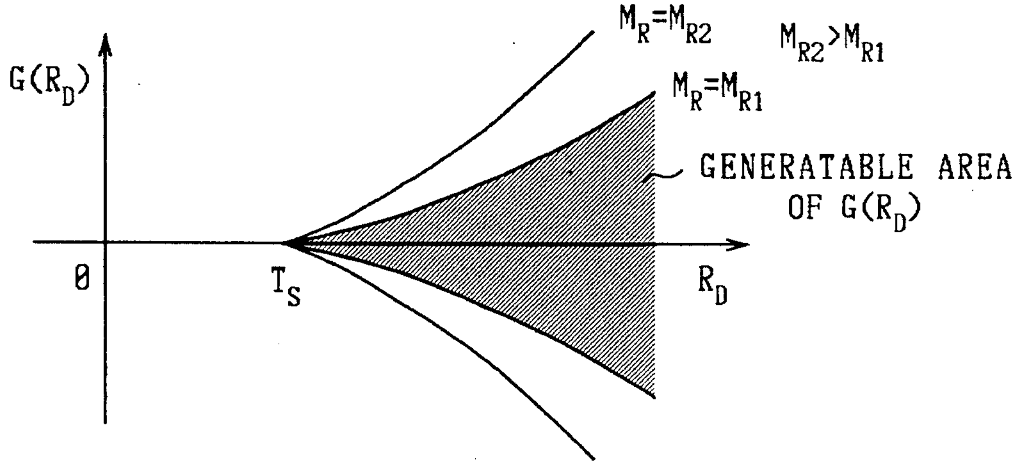
FIG. 4 is a curve diagram illustrating the generating area of the random numbers generated by the random number generator in the image transformation apparatus of FIG. 1.

Here, as shown in FIG. 4, the G($R_D$) random numbers is defined such that the absolute value of the random numbers increases constantly as the distance from the origin increases.

Further, the read address generator 13 proceeds to the succeeding step SP7 to transform the polar coordinates ($R_{M2}$, $\theta_{M2}$) into orthogonal coordinates ($X_M$, $Y_M$), and then adds the constants $X_C$ and $Y_C$ to them respectively to obtain the read address (X', Y'), at step SP8. At step SP9, the video signal is read from the frame memory based on the above read address (X', Y'), so that it obtains the effect such that the center of the effect of the image bursts and scatters toward the outside.

Here, the read addresses X' and Y' are represented by the following equations:

$$X'=X_M+X_C=R_{M2}\times\cos(\theta_D)+X_C=(F(R_D)+G(R_D))\times\cos(\theta_D)+X_C \quad (6)$$

$$Y'=Y_M+Y_C=R_{M2}\times\sin(\theta_D)+Y_C=(F(R_D)+G(R_D))\times\sin(\theta_D)+Y_C \quad (7)$$

Figure 5:
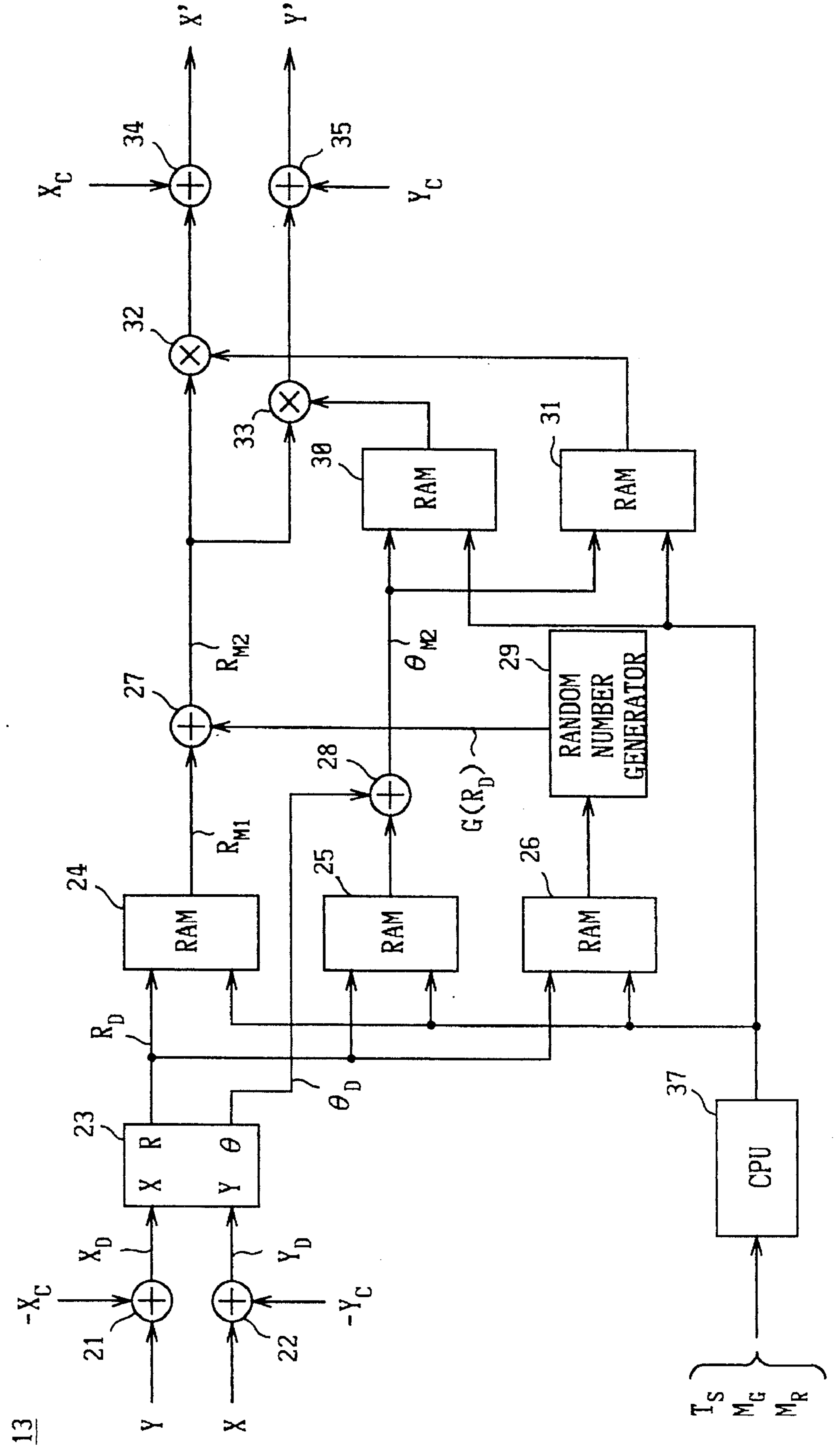
FIG. 5 is a block diagram showing an embodiment of the read address generator in the image transformation apparatus of FIG. 1.

FIG. 5 shows the construction of the read address generator 13. The sequential read address X is added to $-X_C$ via an adding circuit 21, and then it is input to a coordinate transforming circuit 23. Also, the sequential read address Y is added to $-Y_C$ in an adding circuit 22, and then it is input to the coordinate transforming circuit 23.

In the coordinate transforming circuit 23, the distance $R_D$ from the center of the burst transformed into the polar coordinates, is input to RAMs 24, 25, and 26. Here, the data in the RAM 24 is set to $R_M1=F(R_D)$ by the above equation (2), and the data in the RAM 25 is set to 0 by the above equations (6) and (7). The data set in the RAM 26, in which the random quantity $M_R$ is determined and the output of the random numbers is limited, is represented by the following equation:

$$\text{Gain}=GL(R_D) \quad (8)$$

This "Gain" represented by the equation (8) is the gain input function with respect to the random number generator, for generating the G($R_D$) random numbers. In the CPU 37, these data of the RAMs 24, 25, and 26 are set based on the burst scale $T_S$, the magnification scale of the burst $M_G$, and the random quantity $M_R$.

Further, the angle $\theta_D$ from the center of the burst transformed into the polar coordinates in the coordinate transforming circuit 23, is output to an adding circuit 28 to add the output of the RAM 25, thus $\theta_{M2}$ is obtained, and sent to the RAMs 30 and 31.

Here, the data set in the RAM 30 is $Y_M(\theta)=\sin(\theta_D)$ by the equations (6) and (7), and the data set in the RAM 31 is $X_M(\theta)=\cos(\theta_D)$ by the equations (6) and (7). In the CPU 37, these data of the RAMs 30 and 31 are set based on the burst scale $T_S$, the magnification scale of the burst $M_G$, and the random quantity $M_R$.

The output data of the RAM 26 is input to the random number generator 29. The random number generator 29 sends the random numbers G($R_D$) to an adding circuit 27 on the basis of the above output data of the RAM 26, in order to obtain the data $R_{M2}$ which is added the data $R_{M1}$ output from the RAM 24. The above data $R_{M2}$ is input to multiplying circuits 32 and 33.

The multiplying circuit 32 multiplies the data $R_{M2}$ and the output data from the RAM 31, and outputs the product result to an adding circuit 34 to add the data of the center of the burst $X_C$. Thereby, the read address data X' can be obtained.

The multiplying circuit 33 multiplies the data $R_{M2}$ and the output data from the RAM 30, and outputs the product result to an adding circuit 35 in order to add the data of the center of the burst $Y_C$. Thereby, the read address data Y' can be obtained.

Figure 6:
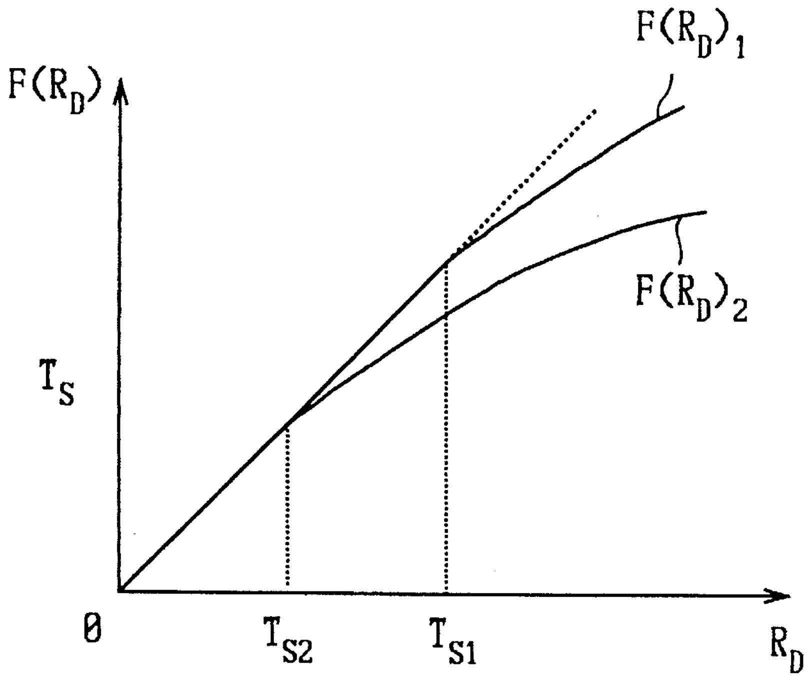
FIG. 6 is a curve diagram explaining the motion of the image transformation apparatus shown in FIG. 1.

In the above construction, as shown in FIG. 6, the function $F(R_D)_1$ has a magnification rate smaller than that of the function $F(R_D)_2$, and the function $F(R_D)_1$ has a burst scale $T_S$ larger than that of the function $F(R_D)_2$ ($T_{S1}$). Accordingly, in the burst effect by the above function $F(R_D)_1$, the burst effect is generated at a position more distant from the center of the burst.

Figure 7:
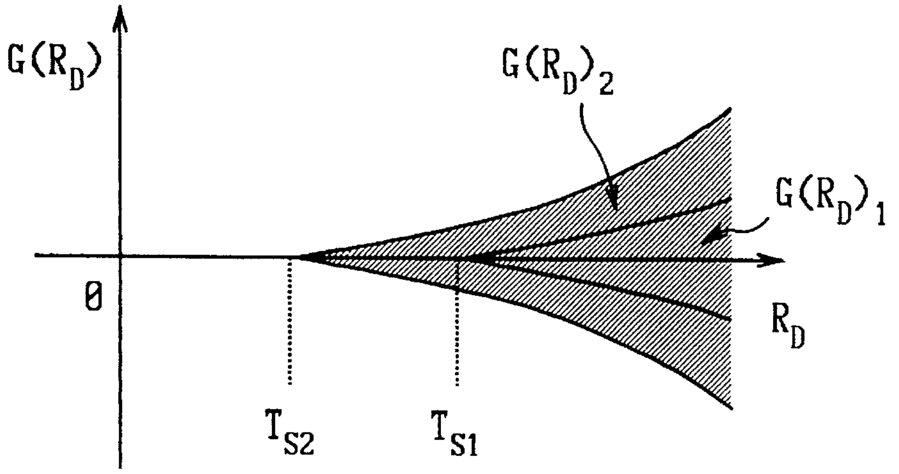
FIG. 7 is a curve diagram explaining the motion of the image transformation apparatus shown in FIG. 1.

Further, as shown in FIG. 7, the random numbers $G(R_D)_1$ has a random quantity smaller than that of the random numbers $G(R_D)_2$, and the random numbers $G(R_{D)1}$ has a burst scale $T_S$ larger than that of the random numbers $G(R_D)_2$. Accordingly, in the burst effect by the above random numbers $G(R_D)_1$, an effect in which the image is scattered to the position more distant from the center of the burst can be obtained.

Figure 8:
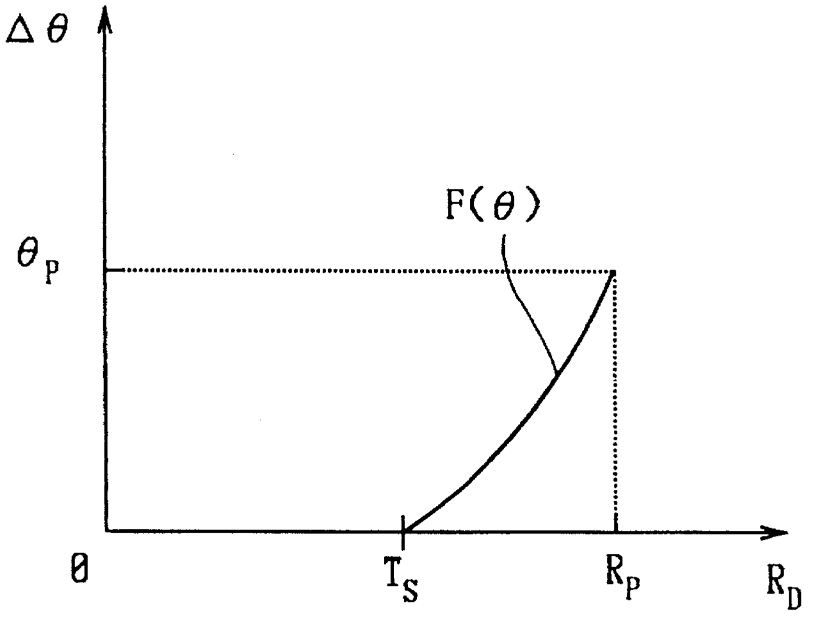
FIG. 8 is a curve diagram explaining the other embodiments of this invention.
Figure 9:
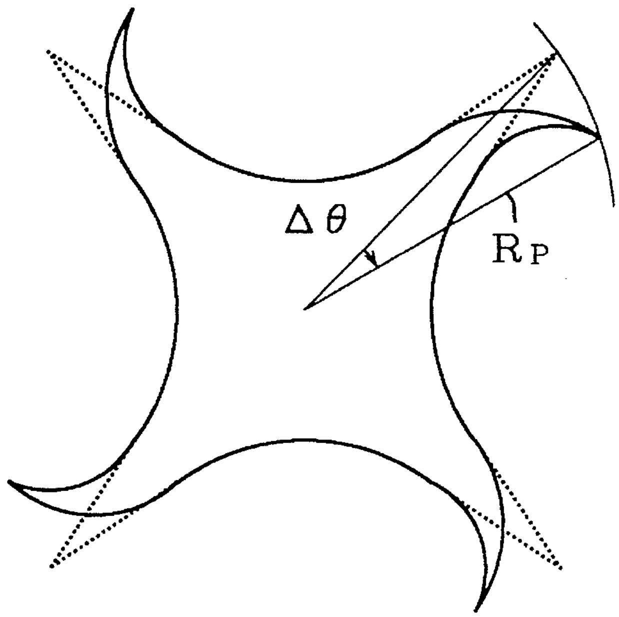
FIG. 9 is a schematic diagram showing the image transformation effect according to the other embodiments of this invention.

In the embodiments described above, the special effect has been such that the image bursts radially and straightly from the center of the burst. However, this invention is not only limited to this, but can be applied to obtain the effect such that the image is rotated by an angle $\Delta\theta$ in the area from the center of the burst to the distance Rp as shown in FIG. 9, by changing the setting data of the RAM 25 to, for example, the function F(θ) as shown in FIG. 8.

Further, in the embodiment described above, the burst effect is obtained in the two-dimensional plane. However, this invention is not only limited to this, but the sequential read address (X, Y) input to the read address generator 13 may be processed by a three-dimensional matrix.

That is, the read address data multiplied by the three-dimensional matrix $X_{3D}$ and $Y_{3D}$, $a_{11}$ to $a_{33}$ may be used as the three-dimensional transform matrix, and the read address ($X_{3D}$, $Y_{3D}$) represented by the following equations:

$$X_{3D} = \frac{a_{11} \times X + a_{12} \times Y + a_{13}}{a_{31} \times X + a_{32} \times Y + a_{23}} \quad (9)$$

$$Y_{3D} = \frac{a_{21} \times X + a_{22} \times Y + a_{23}}{a_{31} \times X + a_{32} \times Y + a_{33}} \quad (10)$$

may be input to the read address generator 13.

While there has been described in connection with the preferred embodiments of the invention, it will be obvious to those skilled in the art that various changes and modifications may be made, therefore, to cover in the appended claims all such changes and modifications as fall within the true spirit and scope of the invention.

What is claimed is:

1. Apparatus for transforming input video data representing an input video image, comprising:

storage means for storing said input video data;

means for supplying a rectangular coordinate address representing a location in a transformed image;

means for transforming said rectangular coordinate address to a polar coordinate address having a radius coordinate and an angular coordinate;

means for extending said radius coordinate of said polar coordinate address in accordance with a burst function to produce an extended radius coordinate;

means for generating a random number within a range of values whose range is a function of the value of the radius coordinate of said polar coordinate address;

means for adding said random number to said extended radius coordinate to produce a modified radius coordinate;

means for converting said modified radius coordinate and said angular coordinate to a transformed rectangular coordinate address; and means for retrieving from said storage means said input video data corresponding to said transformed rectangular coordinate address of said input video image and providing said retrieved input video data as data at said rectangular coordinate address of said transformed image.

2. The apparatus of claim 1, wherein said range of values of said random number increases as the value of the radius coordinate increases.

3. The apparatus of claim 1, wherein said burst function includes a burst scale which represents the value of said radius coordinate at which said means for extending begins to extend.

4. The apparatus of claim 3, wherein said range of values of said random number is a function of both the value of the radius coordinate and the burst scale.

5. Method of transforming input video data representing an input video image, comprising the steps of:

storing said input video data in a memory;

supplying a rectangular coordinate address representing a location in a transformed image;

transforming said rectangular coordinate address to a polar coordinate address having a radius coordinate and an angular coordinate;

extending said radius coordinate of said polar coordinate address in accordance with a burst function to produce an extended radius coordinate;

generating a random number within a range of values whose range is a function of the value of the radius coordinate of said polar coordinate address;

adding said random number to said extended radius coordinate to produce a modified radius coordinate;

converting said modified radius coordinate and said angular coordinate to a transformed rectangular coordinate address;

retrieving from said memory said input video data corresponding to said transformed rectangular coordinate address of said into video image; and providing said retrieved into video data as data at said rectangular coordinate address of said transformed image.

6. The method of claim 5, wherein said range of values of said random number increases as the value of the radius coordinate increases.

7. The method of claim 5, wherein said burst function includes a burst scale which represents the value of said radius coordinate whereat said radius coordinate begins to extend.

8. The method of claim 7, wherein said range of values of said random number is a function of both the value of the radius coordinate and the burst scale.

* * * * *